(12) United States Patent
Dou et al.

(10) Patent No.: US 12,132,995 B2
(45) Date of Patent: Oct. 29, 2024

(54) ENHANCING 360-DEGREE VIDEO USING CONVOLUTIONAL NEURAL NETWORK (CNN)-BASED FILTER

(71) Applicant: Intel Corporation, Santa Clara, CA (US)

(72) Inventors: Huan Dou, Beijing (CN); Lidong Xu, Beijing (CN); Xiaoxia Cai, Beijing (CN); Chen Wang, San Jose, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 17/793,348

(22) PCT Filed: Feb. 17, 2020

(86) PCT No.: PCT/CN2020/075548
§ 371 (c)(1),
(2) Date: Jul. 15, 2022

(87) PCT Pub. No.: WO2021/163845
PCT Pub. Date: Aug. 26, 2021

(65) Prior Publication Data
US 2023/0054523 A1 Feb. 23, 2023

(51) Int. Cl.
*H04N 23/698* (2023.01)
*G06T 5/77* (2024.01)
(Continued)

(52) U.S. Cl.
CPC ............ *H04N 23/698* (2023.01); *G06T 5/77* (2024.01); *H04N 19/597* (2014.11);
(Continued)

(58) Field of Classification Search
None
See application file for complete search history.

(56) References Cited

U.S. PATENT DOCUMENTS 9,576,214 B1 * 2/2017 Zhang .................... G06V 20/46
10,607,329 B2 * 3/2020 Sunkavalli ............. G06N 3/047
(Continued)

FOREIGN PATENT DOCUMENTS

CN          110463176          11/2019
WO          2021163845         8/2021

OTHER PUBLICATIONS

International Searching Authority, "International Search Report," issued Nov. 20, 2020 in connection with International Patent Application No. PCT/CN2020/075548, 4 pages.
(Continued)

*Primary Examiner* — Reza Aghevli
(74) *Attorney, Agent, or Firm* — HANLEY, FLIGHT & ZIMMERMAN, LLC

(57) ABSTRACT

An example apparatus for enhancing video includes a decoder to decode a received 360-degree projection format video bitstream to generate a decoded 360-degree projection format video. The apparatus also includes a viewport generator to generate a viewport from the decoded 360-degree projection format video. The apparatus further includes a convolutional neural network (CNN)-based filter to remove an artifact from the viewport to generate an enhanced image. The apparatus further includes a displayer to send the enhanced image to a display.

25 Claims, 5 Drawing Sheets

(51) Int. Cl.
  *H04N 19/597* (2014.01)
  *H04N 19/80* (2014.01)
  *H04N 19/86* (2014.01)

(52) U.S. Cl.
  CPC ............. *H04N 19/80* (2014.11); *H04N 19/86* (2014.11); *G06T 2207/20081* (2013.01); *G06T 2207/20084* (2013.01)

(56) References Cited

U.S. PATENT DOCUMENTS

| | | | |
|---|---|---|---|
| 10,616,482 B2* | 4/2020 | Meler | H04N 5/265 |
| 10,744,936 B1* | 8/2020 | Budhia | B60J 3/04 |
| 11,193,312 B1* | 12/2021 | Weng | B60R 25/01 |
| 11,343,485 B1* | 5/2022 | Pighi | B60R 11/04 |
| 11,416,002 B1* | 8/2022 | Day | A47L 11/4061 |
| 2018/0176468 A1* | 6/2018 | Wang | G09G 5/14 |
| 2018/0241943 A1* | 8/2018 | Lee | H04N 23/90 |
| 2018/0338160 A1* | 11/2018 | Lee | H04N 13/117 |
| 2019/0007679 A1* | 1/2019 | Coban | H04N 19/597 |
| 2019/0014347 A1* | 1/2019 | Hendry | H04N 19/167 |
| 2019/0215532 A1* | 7/2019 | He | H04N 13/383 |
| 2019/0253622 A1* | 8/2019 | Van der Auwera | H04N 19/86 |
| 2019/0253703 A1* | 8/2019 | Coban | H04N 19/159 |
| 2019/0281293 A1* | 9/2019 | Lin | H04N 19/86 |
| 2019/0289327 A1* | 9/2019 | Lin | G06N 3/045 |
| 2019/0387212 A1* | 12/2019 | Oh | G06T 7/80 |
| 2020/0053408 A1 | 2/2020 | Park et al. | |
| 2020/0120359 A1* | 4/2020 | Hanhart | H04N 19/176 |
| 2020/0322632 A1* | 10/2020 | Hanhart | H04N 19/176 |
| 2021/0012126 A1* | 1/2021 | Porta | B60H 1/00742 |
| 2021/0112275 A1* | 4/2021 | Kk | H04N 19/597 |
| 2021/0127204 A1* | 4/2021 | Porta | G06N 20/20 |
| 2022/0078435 A1* | 3/2022 | Lee | H04N 19/50 |
| 2022/0141461 A1* | 5/2022 | Zhang | H04N 19/117 375/240.29 |

OTHER PUBLICATIONS

International Searching Authority, "Written Opinion," issued Nov. 20, 2020 in connection with International Patent Application No. PCT/CN2020/075548, 4 pages.

European Patent Office, "Extended European Search Report," issued Jun. 28, 2023 in connection with European Patent Application No. 20920220.9, 8 pages.

Yin et al., "AHG9: Multiple Convolution Neural Networks For Sequence-Independent Processing," Joint Video Experts Team (JVET) of ITU-T SG 16 WP 3 and ISO/IEC JTC 1/SC 29/WG 11, 16th Meeting: Geneva, CH, Oct. 1-11, 2019, 8 pages.

Yin et al., "AHG9: Adaptive Convolutional Neural Network Loop Filter," Joint Video Experts Team (JVET) of ITU-T SG 16 WP 3 and ISO/IEC JTC 1/SC 29/WG 11, 13th Meeting: Marrakesh, MA, Jan. 11, 2019, 19 pages.

Lee et al. "AHG6/AHG17: Generalized cubemap projection syntax for 360-degree videos, Version 1" (JVET-P0597) Joint Video Experts Team (JVET) of ITU-t SG 16 WP 3 and ISO/IEC JTC 1/SC 29/WG 11 16th Meeting: Geneva, CH, Oct. 1-11, 2019, 12 pages.

Lee et al. "AHG6/AHG17: Generalized cubemap projection syntax for 360-degree videos, Version 2" (JVET-P0597) Joint Video Experts Team (JVET) of ITU-t SG 16 WP 3 and ISO/IEC JTC 1/SC 29/WG 11 16th Meeting: Geneva, CH, Oct. 1-11, 2019, 12 pages.

Lee et al. "AHG6/AHG17: Generalized cubemap projection syntax for 360-degree videos, Version 3" (JVET-P0597) Joint Video Experts Team (JVET) of ITU-t SG 16 WP 3 and ISO/IEC JTC 1/SC 29/WG 11 16th Meeting: Geneva, CH, Oct. 1-11, 2019, 12 pages.

Boyce et al., "Supplemental enhancement information messages for coded video bitstreams (Draft 1)," Joint Video Experts Team (JVET) of ITU-T SG 16 WP 3 and ISO/IEC JTC 1/SC 29/WG 11, 15th Meeting: Gothenburg, SE, Jul. 3-12, 2019, 27 pages.

Lee et al. "AHG6/AHG17: Generalized cubemap-based projection syntax for 360-degree videos," (JVET-P0597) Joint Video Experts Team (JVET) of ITU-t SG 16 WP 3 and ISO/IEC JTC 1/SC 29/WG 11 16th Meeting: Geneva, CH, Oct. 1-11, 2019, 15 pages.

* cited by examiner

200

300

ENHANCING 360-DEGREE VIDEO USING CONVOLUTIONAL NEURAL NETWORK (CNN)-BASED FILTER

This Patent arises from a U.S. National Stage Patent Application under 35 U.S.C. § 371 of the PCT Patent Application No. PCT/CN2020/075548, filed Feb. 17, 2020, and entitled "ENHANCING 360-DEGREE VIDEO USING CONVOLUTIONAL NEURAL NETWORK (CNN)-BASED FILTER." PCT Patent Application No. PCT/CN2020/075548 is hereby incorporated herein by reference in its entirety.

BACKGROUND 360-degree videos may be compressed using various formats for reduced size during transmission. For example, such compression may include various geometric transformations, such as rectilinear projection.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
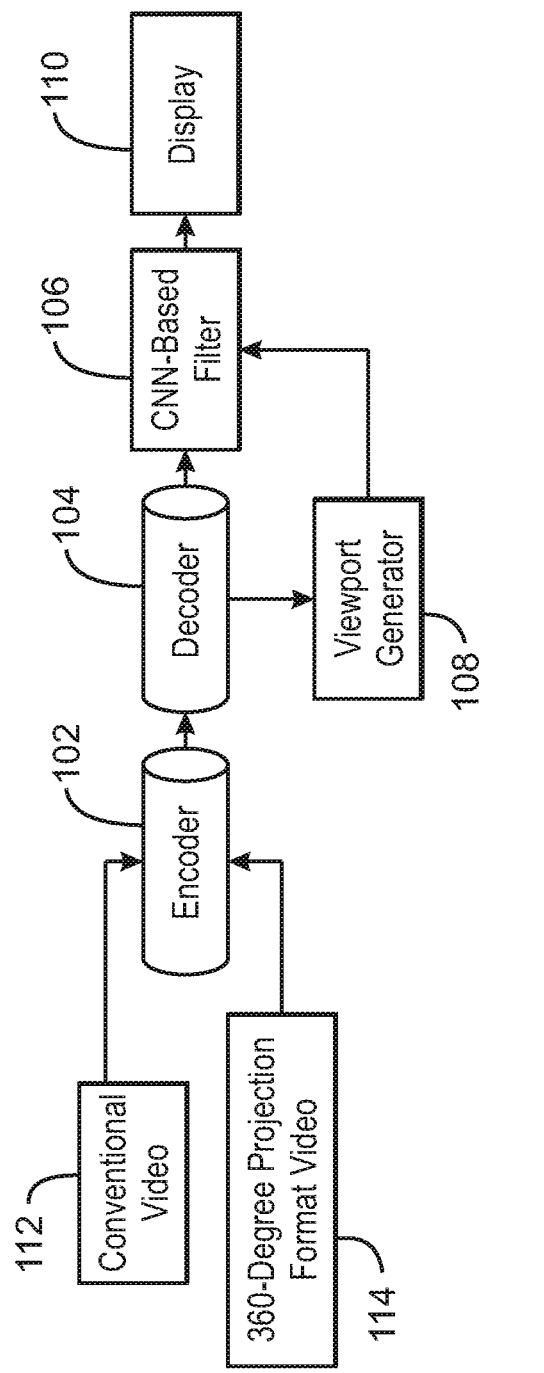
FIG. 1 is a block diagram illustrating an example system for decoding video using a CNN-based filter.

Videos may be encoded to lower bitrate compressed videos for applications with limited network bandwidth and storage capacity. However, such encoding may introduce visible artifacts, which may include compression artifacts such as blocky artifacts and ringing artifacts, among others. These compression artifacts may seriously degrade the viewing experience for users. For example, the compression artifacts may be visible and distracting to users viewing a video.

Compression artifacts may occur in 360-degree video. As used herein, a 360-degree video is an omnidirectional video that enables a full 360 degree range of movement within the video. 360-degree video is emerging as a new form of omnidirectional video to enable end-users to freely select their preferred viewing direction to watch scenes. For example, a geometric transformation may be used to map the 360-degree video to each user's viewport. A viewport, as used herein, refers to a two-dimensional (2D) rectangle used to project a three-dimensional (3D) scene to a position of a virtual camera. For example, the position of the virtual camera may be controlled using a head mounted display (HMD), or any other suitable virtual reality viewing device. In one example, the geometric transformation may be rectilinear projection. Unlike conventional video compression, which may be directly applied to the captured frame, the encoding and subsequent compression of 360-degree video is applied to the projection format instead. Consequently, encoding of the projection format may have a considerable impact on the compression artifacts introduced by the video encoder on 360-degree video. In particular, the compression artifact in the projection format may be severely distorted when mapped to a user's viewport. Specifically, the geometric transformation distorts the conventional compression artifacts that appear at the projection format and induces these distorted compression artifacts to the end-user's viewport. This kind of distorted artifact may not be reduced or removed by conventional techniques, such as in-loop deblocking and de-ringing filters. For example, the encoding and decoding of 360-degree video may be applied to the projection format, so the in-loop deblocking or de-ringing filter can reduce the compression artifact appears in the projection format. However, user do not directly watch the projection format, they watch the viewport. The in-loop deblocking filter may thus reduce, but not completely remove the blocky artifact. In particular, under low bitrate conditions, where the blocky artifacts may be severe after encoding, remaining blocky artifacts in the projection format may appear at the viewport and be distorted after the viewport mapping and generation process. On the other hand, seam artifacts, which may not be noticed on projection format, may also become visible on the viewport. Since the viewport mapping and generation stage is at the display side which is after the decoder loop, there are no in-loop filters and the artifacts appearing at the viewport may not be dealt with.

Compression artifacts may be injected into the video at various points during compression. Accordingly, different types of artifacts exist. In some instances, blocky artifacts may appear when the input video is compressed with a block-based compression scheme. For example, the blocky artifacts may be severe even while a default deblocking filter is enabled. Default deblocking filters are used to mitigate blocky artifacts, but may not be able to remove all blocky artifacts. For example, under very low bitrate conditions, the blocky artifact is even more severe and the strength of the default in-loop deblocking filter may not be strong enough to mitigate these blocky artifact. Ringing artifacts mostly appear along strong edges. Ringing artifacts may be caused by the block-based transform compression algorithms commonly used in video coding schemes. For example, compressed video frames may contain severe ringing artifacts, particularly along characters and graphic edges. Screen content video may also have severe ringing artifacts, since screen content video usually contains more sharp edges than natural videos.

Another example of such artifacts is radial artifacts. The Equirectangular Projection (ERP) format is a commonly used projection format to describe 360-degree video. The ERP format maps meridians to vertical straight lines of constant spacing and circles of latitude to horizontal straight lines of constant spacing. However, areas near polar regions may be stretched severely to keep the same projection width as the area at the equator region. After the lossy coding performed upon ERP format video, blocky artifacts may appear near the oversampled polar regions, which may turn into radial artifacts in corresponding areas of generated viewports.

Another example of artifacts is seam artifacts. For example, the left and right boundaries of the ERP format are originally continuous in the spherical domain. This may not be considered during encoding because the encoder is applied to the projection format instead of the sphere domain. As a consequence, a seam artifact may be observed in a viewport generated along the left and right boundaries of the ERP format after encoding. The Cube Map Projection (CMP) format is another commonly used format to describe 360-degree video. In particular, the CMP format projects the scene onto each side of a cube. Then, all sides of the cube are packed into a 3×2 layout. For example, a cube has six square faces in total, so the 6 faces may be packed into a 3×2 layout including three faces on a first row and three faces on a second row. However, the use of multiple faces may lead to severe seam artifacts in the viewport generated at multiple face boundaries.

In some examples, for 360-degree video, some methods attempt to reduce the seam artifact by padding pixels on the left and right frame boundaries in equirectangular projection (ERP) format before compression. On the decoder side, a padded ERP (PERP) format can be converted back to the ERP format by cropping or blending the duplicated samples. However, these solutions mostly reduce compression artifacts as in-loop filters such that for 360-degree video the distorted compression artifacts appearing in the viewport cannot be dealt with. Moreover, the complexity of some CNN-based solutions may be too high for real-time performance. Although a padding operation for 360-degree video projection format can be used to remove seam artifacts, such padding operations may decrease the coding efficiency because the padded format is of higher resolution than the original format. Moreover, there may not be any effective method that can remove radial artifacts appearing in a viewport extracted from the polar regions of the ERP format.

Traditionally, sample adaptive offset (SAO) and deblocking filters were adopted to remove various compression artifacts in the High Efficiency Video Coding (HEVC/H.265) video compression standard, the latest version of which was released November 2019. To further enhance the reconstructed frame quality, an adaptive loop filter (ALF) was adopted in the Versatile Video Coding (VVC) video compression standard, currently set to be released July 2020. However, these SAO, deblocking filters, and adaptive loop filters may not be able to remove all the compression artifacts discussed above. In particular, these filters are all in-loop filters, so they may only be able to remove the artifact appears in projection format, not the viewport.

The present disclosure relates generally to techniques for decoding 360 video. Specifically, the techniques described herein include an apparatus, method and system for enhancing 360-degree video using a CNN-based filter. In particular, a CNN-based filter is used to enhance the decoded video quality as an out-loop filter. As used herein, an out-loop filter is a filter applied outside of a decoding processing loop. For example, For example, a 360-degree projection format video bitstream may be decoded and filtered by the CNN-based filter to be displayed without various artifacts. An example apparatus includes a decoder to decode a received 360-degree projection format video bitstream to generate a decoded 360-degree projection format video. The apparatus also includes a viewport generator to generate a viewport from the decoded 360-degree projection format video. The apparatus further includes a convolutional neural network (CNN)-based filter to remove an artifact from the viewport to generate an enhanced image. The apparatus further includes a displayer to send the enhanced image to a display.

The techniques described herein thus enable 360-degree video to be decoded with minimal artifacts. In addition, the techniques described herein may also be used to enable regular video to be decoded with minimal artifacts as well. In particular, the CNN-based artifact removal scheme can improve the peak signal-to-noise ratio (PSNR) for all video types. The CNN-based scheme with high complexity (HC) network topology as described herein can achieve higher PSNR improvement than that with a low complexity (LC) network topology. Moreover, the techniques described herein reduce blocky artifacts and the ringing artifacts, with the edges or boundaries of images becoming clean and sharp. In addition, seam artifacts and radial artifacts are also effectively removed using the present techniques. By using an out-loop filter, video quality can be enhanced without modifying the encoder and decoder. In particular, in-loop filters may only process or execute on the projection format, the out-loop filter of the techniques described herein can process or execute on viewports generated after the decoding process.

FIG. 1 is a block diagram illustrating an example system for decoding video using a CNN-based filter. The example system 100 can be implemented in the computing device 400 in FIG. 4 using the method 300 of FIG. 3.

The example system 100 includes an encoder 102. The system 100 also includes a decoder 104 communicatively coupled to the encoder 102. For example, the decoder 104 may be coupled to the encoder 102 via a network. The system 100 also includes a convolutional neural network (CNN)-based filter 106. The system 100 also further includes a viewport generator 108 communicatively coupled to the decoder 104 and the CNN-based filter 106. The system 100 also includes a display 110. For example, the display may be a monitor or a head-mounted display (HMD).

The system 100 may receive compressed video from an encoder 102. For example, the compressed video may include, but is not limited to, both conventional video 112 and 360-degree video 114. In various examples, for conventional video 112, the CNN-based filter 106 is applied as a post-processing filter after the compressed video is decoded at the decoder 104. The enhanced video is then displayed for the user at the display 110. For example, the display may be a monitor or any other suitable display device.

In various examples, for 360-degree video 114, the CNN-based filter 106 may be designed to process video frames in a user's viewport instead of directly processing the 360-degree projection format video 114. The 360-degree projection format video 114 may describe a whole three dimensional scene's information using a 2D representation. Therefore, the content of the 360-degree projection format video 114 frame is much different from the conventional video and may not be directly viewable by the user. By contrast, a viewport video frame is a conventional video frame that may be directly viewed by the user. In various examples, a viewport frame is generated using rectilinear projection from the projection format frame according to the user's viewing angle information (from HMD). The viewport frame only contains content that is in the user's viewing area. So the frames of the viewport video are not simply a subset of frames from the 360-degree video. Thus, the CNN-based filter 106 may be designed to process viewports in order to reduce the visible compression artifact in user's viewports that cannot be removed by the in-loop filter. Then, the enhanced viewport may be displayed for the user at the display 110. In various examples, the display 110 may be an HMD device display.

In various examples, the network topology in the proposed CNN-based filter 106 can either be designed with light complexity (LC) for rigid real-time performance uses. For example, the CNN-based filter 106 can be implemented using the CNN-based filter 200 of FIG. 2 with reduced numbers of feature maps at each convolutional layer. An LC CNN based filter 106 may also have a reduced number of convolutional layers. In some examples, the CNN-based filter 106 can be designed with high complexity (HC) to provide a high-quality visual experience. For example, the CNN-based filter 106 can be implemented using the CNN-based filter 200 of FIG. 2 with increased numbers of feature maps in each convolutional layer. In some examples, the HC CNN-based filter 106 may also have more convolutional layers.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input videos, encoders, decoders, filters, displays, etc.).

Figure 2:
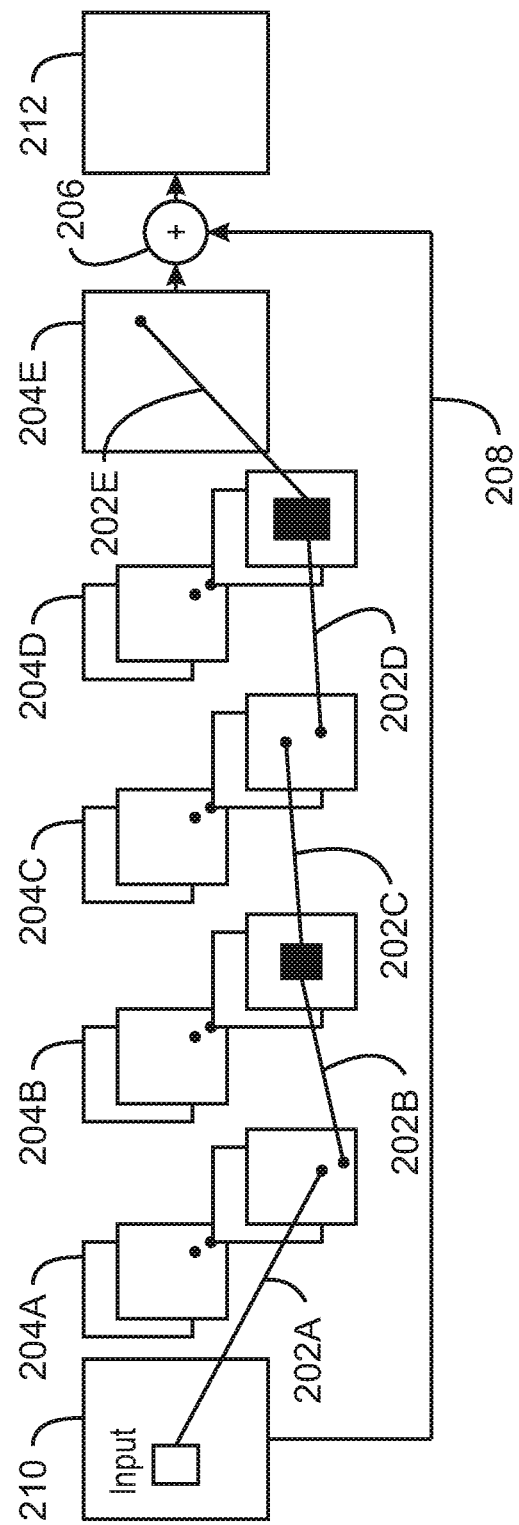
FIG. 2 is a block diagram illustrating an example CNN-based filter.

FIG. 2 is a block diagram illustrating an example CNN-based filter. The example CNN-based filter 200 can be implemented in the computing device computing device 400 in FIG. 4 using the method 300 of FIG. 3.

The example CNN-based filter 200 includes a series of convolutional layers 202A, 202B, 202C, 202D, and a deconvolutional layer 202E. For example, convolutional layer 202A may use a 9×9 convolutional kernel. The convolutional layer 202A may perform a stride two convolution that strides over two pixels at a time. The stride refers to the step of the convolution operation. The convolutional layer 202B may use a 1×1 convolutional kernel. The convolutional layer 202C may use a 7×7 convolutional kernel. The convolutional layer 202D may use a 1×1 convolutional kernel. In various examples, the convolutional layers 202B-202D may take strides of one. The deconvolutional layer 202E may use a 9×9 deconvolutional kernel. The deconvolutional layer 202E may perform a stride two deconvolution. The CNN-based filter 200 also includes sets of feature maps 204A, 204B, 204C, 204D, 204E. For example, the sets of feature maps 204A-204E may have various numbers of feature maps based on a particular topology used. For example, the topology may be a light complexity (LC) topology or a high complexity (HC) topology. The CNN-based filter 200 includes a summation layer 206 communicatively coupled to receive the feature map 204E. As shown by arrow 208, the combiner 206 is also coupled to receive the input image 210. The combiner 206 is shown outputting an enhanced image 212. For example, the enhanced image may exclude any number of artifacts present in the input image 210.

In some examples, the CNN-based filter 200 may be implemented using a light complexity (LC) CNN network topology to enable rigid real-time performance. For example, rigid real-time performance may be determined by the computation resources of the hardware such as CPU or GPU. In particular, the simpler that the CNN network is, the less computational complexity and shorter processing time there may be.

So here the real-time performance means the LC CNN network topology is simple enough to reduce the artifact on each frame quickly during the playback of the viewport video. In various examples, the LC CNN network topology may be an end-to-end residual network with several convolutional layers 204A-204D, a deconvolution layer 204E and a summation layer 206. In some examples, an activation function layer (not shown) is inserted behind each convolution layer. In the LC CNN network topology, the sets of feature maps may have a predefined number of feature maps. For example, the set of features maps 204A may include 32 feature maps. The set of feature maps 204B may include 16 feature maps. The set of feature maps 204C may also include 16 feature maps. The set of feature maps 204D may include 32 features maps. The set of feature maps 204E may include one feature map. For example, the feature map 204E may have the same resolution of the input image 210.

The LC CNN network topology may be both lightweight and compatible with parallel computing to enable rigid real-time performance. For a 720p input video, the overall computational complexity of the LC CNN network may be 4.32 Giga floating point operations per second (FLOPS) per frame, which may easily be run on modern computing resources for real-time performance.

In some examples, the CNN-based filter 200 may be implemented using a high complexity (HC) topology. For example, a CNN-based filter 200 with HC topology may include a set of features 204A with 64 feature maps. The set of feature maps 204B and 204C in an HC topology may include 32 feature maps. The set of feature maps 204D may also include 64 feature maps. The set of feature maps 204E may include one feature map. For example, the feature map 204E may have the same resolution of the input image 210. In various examples, an HC topology may be used on high performance CPUs and GPUs that may have enough computing resources to satisfy real-time requirement. IN some examples, the HC topology may also be used for some cases that are less strict on the processing time, such as image artifact removal.

The diagram of FIG. 2 is not intended to indicate that the example CNN-based filter 200 is to include all of the components shown in FIG. 2. Rather, the example CNN-based filter 200 can be implemented using fewer or additional components not illustrated in FIG. 2 (e.g., additional input images, feature maps, layers, enhanced images, etc.).

Figure 3:
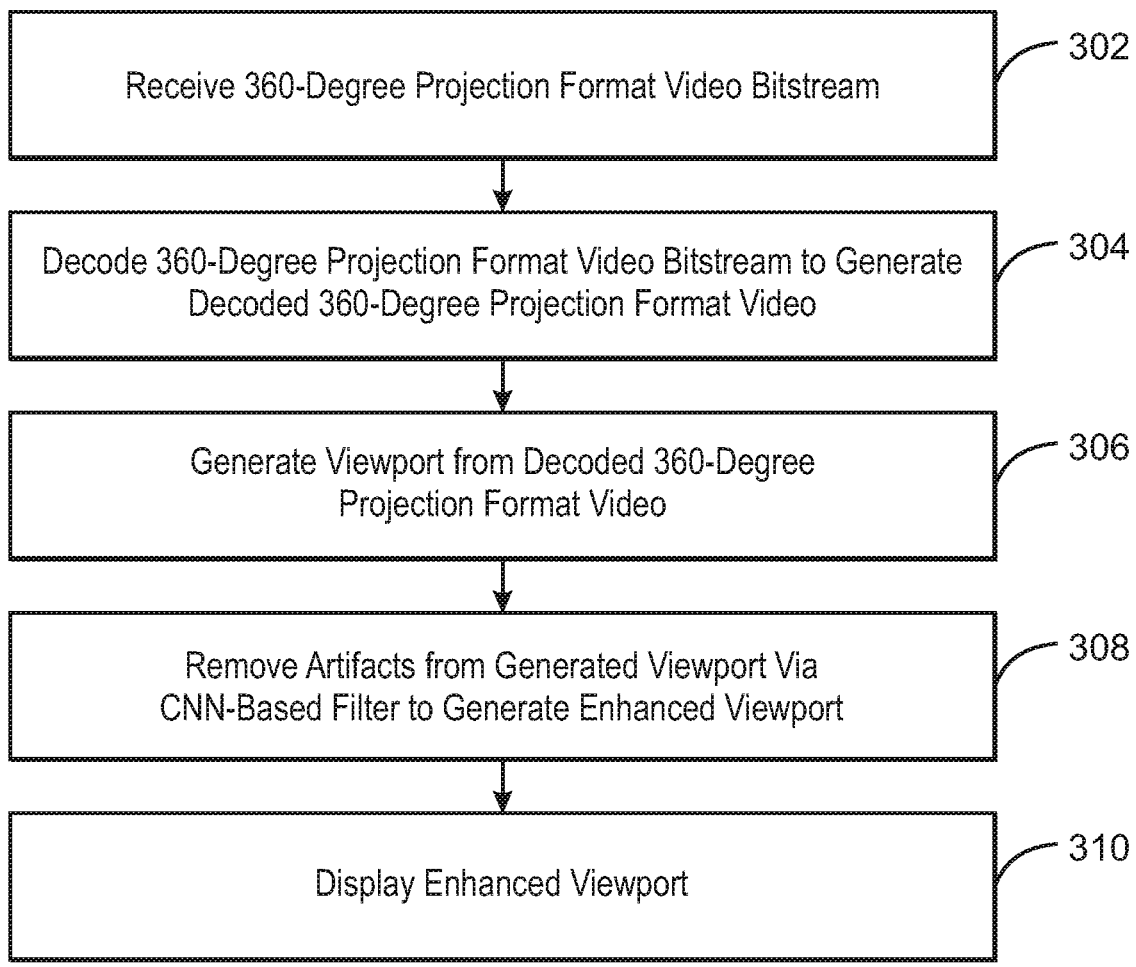
FIG. 3 is a flow chart illustrating a method for decoding video using a CNN-based filter.

FIG. 3 is a flow chart illustrating a method for decoding video using a CNN-based filter. The example method 300 can be implemented in the system 100 of FIG. 1, the computing device 400 of FIG. 4, or the computer readable media 500 of FIG. 5.

At block 302, a 360-degree projection format video bitstream is received. For example, the 360-degree projection format video may be compressed using various techniques of combining neighboring views. In some examples, a conventional video bitstream may also be received.

At block 304, the 360-degree projection format video bitstream is decoded to generate a decoded 360-degree projection format video. In some examples, a conventional video bitstream may be also be decoded using any suitable codec. In various examples, the decoding operation may be conducted based on the video coding standard, and may involve an inverse quantization, an inverse transform, a residual reconstruction, among other operations.

At block 306, a viewport is generated from the decoded 360-degree projection format video. For example, the processor can receive view information from a display device and generate the viewport from the decoded 360-degree projection format video based on the view information. For example, the view information may be the viewer's view angle information provided as coordinates. In various examples, the viewport may be generated using rectilinear projection, and may be defined by the particular coding standard used. For example, a particular viewport may be generated based on coordinates received from an HMD. The viewport generation may start from a sample position on the projected viewport such as coordinates received from an HMD, first finds corresponding 3D (X, Y, Z) coordinates, and then finds the corresponding 2D coordinates in the source projection format plane. The viewport generation process then takes the corresponding sample value at the corresponding position on the source 2D projection format plane.

At block 308, artifacts are removed from the generated viewport via a CNN-based filter to generate an enhanced viewport. For example, the enhanced viewport may exclude one or more artifacts present in the generated viewport. In various examples, the CNN-based filter may be an out-loop filter. An out-loop filter may be a filter applied outside a decoding process. In some examples, the CNN-based filter includes a convolutional neural network with a low complexity topology or a high complexity topology. For example, applications with rigid real-time use such as gaming applications may use a low complexity topology. In other examples, a high complexity topology may be used for higher quality if rigid real-time use is not a factor. In various examples, the CNN-based filter includes a convolutional neural network with a stride two convolutional layer and a stride two deconvolutional layer.

At block 310, the enhanced viewport is rendered. For example, the viewport may be displayed via an HMD device.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
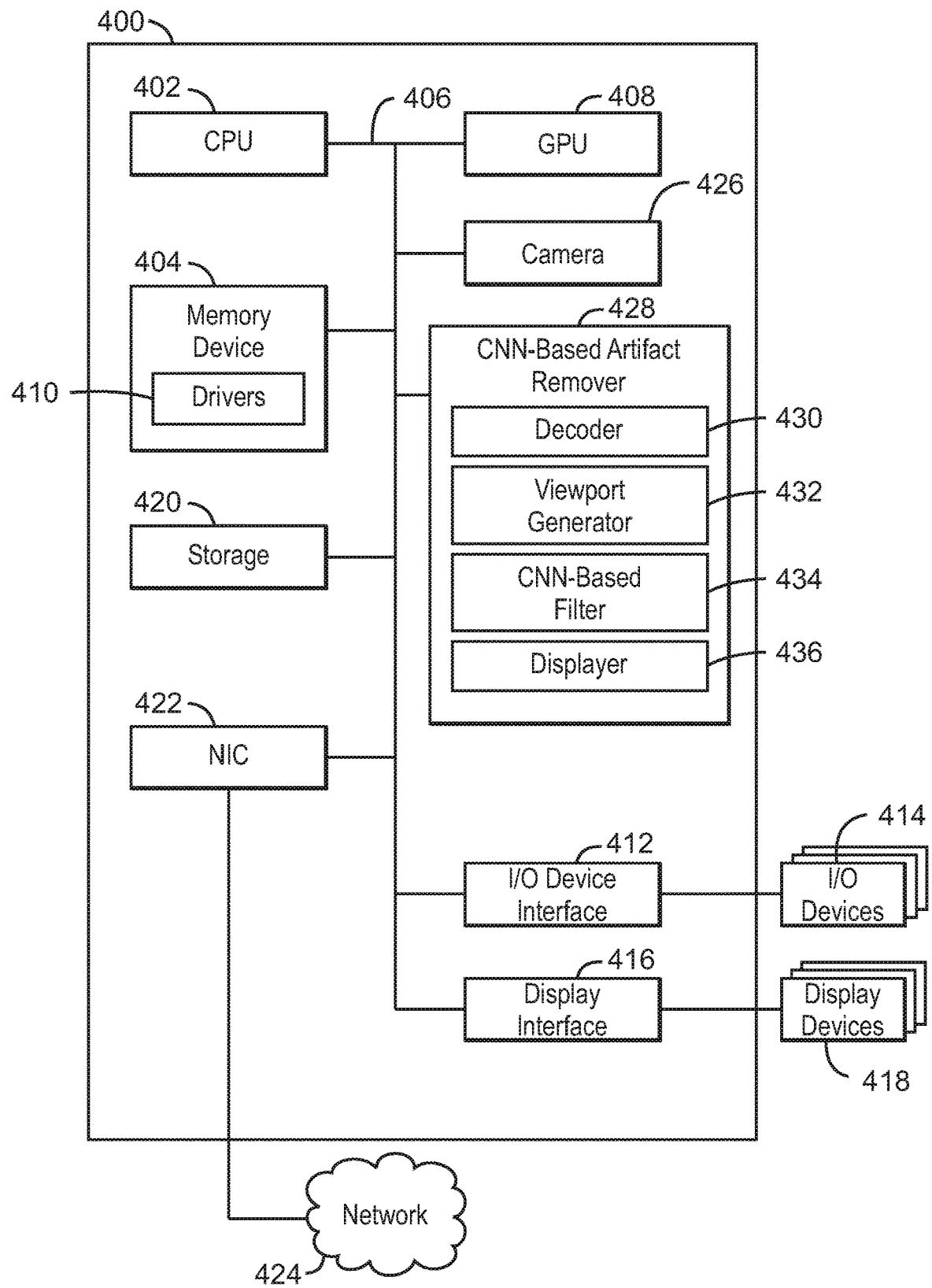
FIG. 4 is block diagram illustrating an example computing device that can decode video using a CNN-based filter.

Referring now to FIG. 4, a block diagram is shown illustrating an example computing device that can decode video using a CNN-based filter. The computing device 400 may be, for example, a laptop computer, desktop computer, tablet computer, mobile device, or wearable device, among others. In some examples, the computing device 400 may be a display device, such as a virtual reality headset. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. In some examples, the CPU 402 can be a specialized digital signal processor (DSP) used for image processing. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for training multiple convolutional neural networks to perform sequence independent processing. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 400 further includes a camera 426. For example, the camera 426 may include one or more imaging sensors. In some example, the camera 426 may include a processor to generate video frames.

The computing device 400 further includes a convolutional neural network (CNN) based artifact remover 428. For example, the CNN based artifact remover 428 can be used to decode 360-degree video with reduced artifacts. In some examples, the CNN based artifact remover 428 can also be used to decode conventional video with reduced artifacts. The CNN based artifact remover 428 can include a decoder 430, a viewport generator 432, CNN-based filter 434, and a displayer 436. In some examples, each of the components 430-436 of the CNN-based artifact remover 428 may be a microcontroller, embedded processor, or software module. The decoder 430 can decode a received 360-degree projection format video bitstream. For example, the 360-degree projection format video bitstream to generate a decoded 360-degree projection format video. In some examples, the decoder 430 can receive a compressed conventional video bitstream and decompress the conventional video bitstream to generate conventional video frames. The viewport generator 432 can generate a viewport from the decoded 360-degree projection format video. The CNN-based filter 434 can remove any number of artifacts from the generated viewport. For example, the artifacts may include a blocky artifact, a ringing artifact, a radial artifact, a seam artifact, or any combination thereof. In some examples, the CNN-based filter 434 can remove an artifact from the decompressed conventional video. For example, the artifact may be a blocky artifact, a ringing artifact, a radial artifact, or a seam artifact. In various examples, the CNN-based filter 434 includes a light complexity (LC) topology. In some examples, the CNN-based filter 434 includes a high complexity (HC) topology. In various examples, the CNN-based filter 434 includes a stride two convolutional layer and a stride two deconvolutional layer. In some examples, the CNN-based filter includes an out-loop filter. The displayer 436 can display the enhanced image.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. The computing device 400 may include any number of additional components not shown in FIG. 4, depending on the details of the specific implementation. Furthermore, any of the functionalities of the decoder 430, the viewport generator 432, the CNN-based filter 434, and the displayer 436, may be partially, or entirely, implemented in hardware and/or in the processor 402. For example, the functionality may be implemented with an application specific integrated circuit, in logic implemented in the processor 402, or in any other device. In addition, any of the functionalities of the CPU 402 may be partially, or entirely, implemented in hardware and/or in a processor. For example, the functionality of the CNN based artifact remover 428 may be implemented with an application specific integrated circuit, in logic implemented in a processor, in logic implemented in a specialized graphics processing unit such as the GPU 408, or in any other device.

Figure 5:
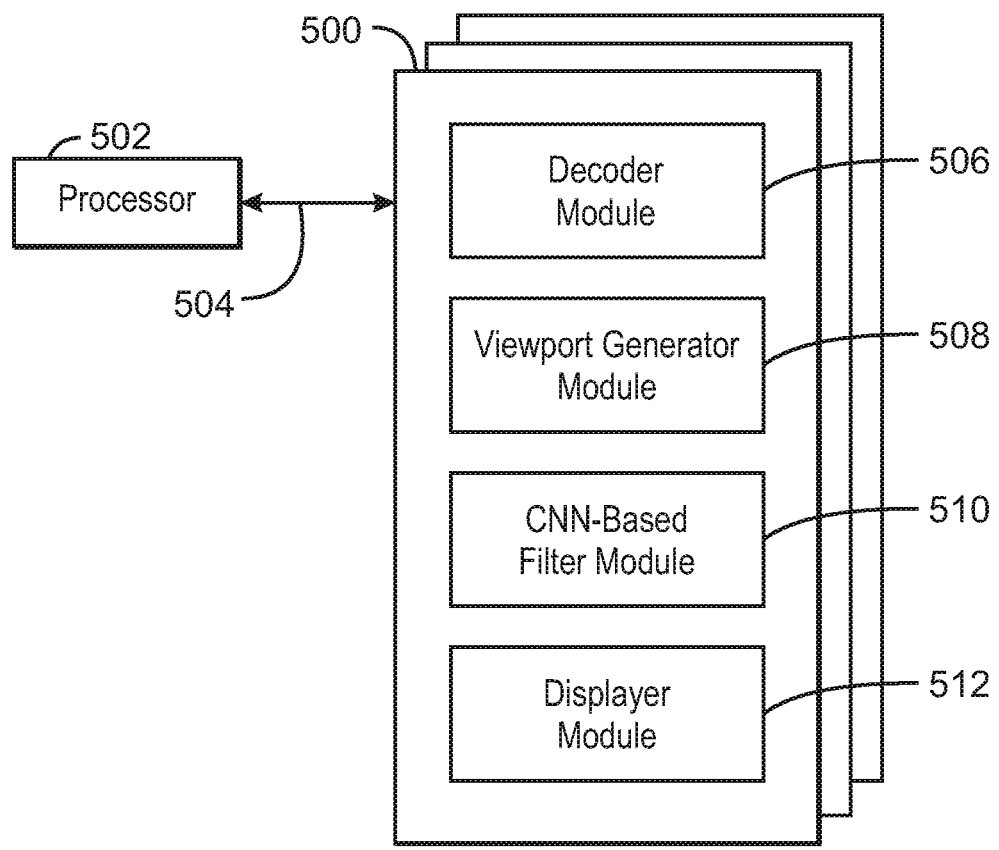
FIG. 5 is a block diagram showing computer readable media that store code for decoding video using a CNN-based filter.

FIG. 5 is a block diagram showing computer readable media 500 that store code for decoding video using a CNN-based filter. The computer readable media 500 may be accessed by a processor 502 over a computer bus 504. Furthermore, the computer readable medium 500 may include code configured to direct the processor 502 to perform the methods described herein. In some embodiments, the computer readable media 500 may be non-transitory computer readable media. In some examples, the computer readable media 500 may be storage media.

The various software components discussed herein may be stored on one or more computer readable media 500, as indicated in FIG. 5. For example, a decoder module 506 may be configured to decode a received 360-degree projection format video bitstream. For example, the decoder module 506 may be configured to generate a decoded 360-degree projection format video based on the 360-degree projection format video bitstream. In some examples, the decoder module 506 may also be configured to decompress received conventional video bitstreams to generate conventional video frames. A viewport generator module 508 may be configured to generate a viewport from the decoded 360-degree projection format video. For example, the viewport generator module 508 may be configured to receive view information from a display device and generate the viewport from the decoded 360-degree projection format video based on the view information. A CNN-based filter module 510 may be configured to remove a number of artifacts from the generated viewport to generate an enhanced image. For example, the CNN-based filter module 510 may be configured with a low complexity topology. In some examples, the CNN-based filter module 510 may be configured with high complexity topology. In various examples, the CNN-based filter may be configured with a stride two convolutional layer and a stride two deconvolutional layer. In some examples, the CNN-based filter module 510 may also be configured to remove an artifact from conventional video frames. A displayer module 512 may be configured to display the enhanced image. For example, the displayer module 512 may be configured to send the enhanced image to a HMD device to be displayed. In some examples, the displayer module 512 may be configured to send the enhanced image to a monitor or other display device.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation. For example, the computer readable media 500 may also include a training module to training the CNN-based filter to remove blocky artifacts using training pairs of ground truth images and corresponding images with blocky artifacts added. In some examples, the training module may be configured to train the CNN-based filter to remove ringing artifacts using training pairs of ground truth images and corresponding images with ringing artifacts added. In various examples, the training module may be configured to train the CNN-based filter to remove blocky radial using training pairs of ground truth images and corresponding images with radial artifacts added. In some examples, the training module may be configured to train the CNN-based filter to remove blocky artifacts using training pairs of ground truth images and corresponding images with seam artifacts added.

EXAMPLES

Example 1 is an apparatus for enhancing video. The apparatus includes a decoder to decode a received 360-degree projection format video bitstream to generate a decoded 360-degree projection format video. The apparatus also includes a viewport generator to generate a viewport from the decoded 360-degree projection format video. The apparatus further includes a convolutional neural network (CNN)-based filter to remove an artifact from the viewport to generate an enhanced image. The apparatus also further includes a displayer to send the enhanced image to a display.

Example 2 includes the apparatus of example 1, including or excluding optional features. In this example, the decoder is to receive a compressed conventional video and decompress the conventional video, the CNN-based filter to remove an artifact from the decompressed conventional video.

Example 3 includes the apparatus of any one of examples 1 to 2, including or excluding optional features. In this example, the CNN-based filter includes a CNN with a light complexity (LC) topology.

Example 4 includes the apparatus of any one of examples 1to 3, including or excluding optional features. In this example, the CNN-based filter includes a CNN with a high complexity (HC) topology.

Example 5 includes the apparatus of any one of examples 1to 4, including or excluding optional features. In this example, the CNN-based filter includes a CNN with a stride two convolutional layer and a stride two deconvolutional layer.

Example 6 includes the apparatus of any one of examples 1 to 5, including or excluding optional features. In this example, the CNN-based filter includes an out-loop filter.

Example 7 includes the apparatus of any one of examples 1 to 6, including or excluding optional features. In this example, the artifact includes a blocky artifact.

Example 8 includes the apparatus of any one of examples 1 to 7, including or excluding optional features. In this example, the artifact includes a ringing artifact.

Example 9 includes the apparatus of any one of examples 1 to 8, including or excluding optional features. In this example, the artifact includes a radial artifact.

Example 10 includes the apparatus of any one of examples 1 to 9, including or excluding optional features. In this example, the artifact includes a seam artifact.

Example 11 is a method for enhancing video. The method includes receiving, via a processor, a 360-degree projection format video bitstream. The method also includes decoding, via the processor, the 360-degree projection format video bitstream to generate a decoded 360-degree projection format video. The method further includes generating, via the processor, a viewport from the decoded 360-degree projection format video. The method also further includes removing, via the processor, an artifact from the generated viewport via a convolutional neural network (CNN)-based filter to generate an enhanced viewport.

Example 12 includes the method of example 11, including or excluding optional features. In this example, generating the viewport includes receiving view information from a display device and generating the viewport from the decoded 360-degree projection format video based on the view information.

Example 13 includes the method of any one of examples 11 to 12, including or excluding optional features. In this example, removing the artifact includes using a CNN with a low complexity topology.

Example 14 includes the method of any one of examples 11 to 13, including or excluding optional features. In this example, removing the artifact includes using a CNN with a high complexity topology.

Example 15 includes the method of any one of examples 11 to 14, including or excluding optional features. In this example, removing the artifact includes using a CNN-based filter with a stride two convolutional layer and a stride two deconvolutional layer.

Example 16 includes the method of any one of examples 11 to 15, including or excluding optional features. In this example, the method includes receiving a compressed conventional video bitstream; decompressing the conventional video bitstream to generate conventional video frames; and removing an artifact from the conventional video frames via the CNN-based filter.

Example 17 includes the method of any one of examples 11 to 16, including or excluding optional features. In this example, the method includes training the CNN-based filter to remove blocky artifacts using training pairs of ground truth images and corresponding images with blocky artifacts added.

Example 18 includes the method of any one of examples 11 to 17, including or excluding optional features. In this example, the method includes training the CNN-based filter to remove ringing artifacts using training pairs of ground truth images and corresponding images with ringing artifacts added.

Example 19 includes the method of any one of examples 11 to 18, including or excluding optional features. In this example, the method includes training the CNN-based filter to remove blocky radial using training pairs of ground truth images and corresponding images with radial artifacts added.

Example 20 includes the method of any one of examples 11 to 19, including or excluding optional features. In this example, the method includes training the CNN-based filter to remove blocky artifacts using training pairs of ground truth images and corresponding images with seam artifacts added.

Example 21 is at least one computer readable medium for enhancing video having instructions stored therein that direct the processor to receive a 360-degree projection format video bitstream. The computer-readable medium also includes instructions that direct the processor to decode the 360-degree projection format video bitstream to generate a decoded 360-degree projection format video. The computer-readable medium further includes instructions that direct the processor to generate a viewport from the decoded 360-degree projection format video. The computer-readable medium also further includes instructions that direct the processor to remove an artifact from the generated viewport to generate an enhanced viewport.

Example 22 includes the computer-readable medium of example 21, including or excluding optional features. In this example, the computer-readable medium includes instructions that cause the processor to receive view information from a display device and generating the viewport from the decoded 360-degree projection format video based on the view information.

Example 23 includes the computer-readable medium of any one of examples 21 to 22, including or excluding optional features. In this example, the computer-readable medium includes instructions that cause the processor to remove the artifact using a CNN with a low complexity topology.

Example 24 includes the computer-readable medium of any one of examples 21 to 23, including or excluding optional features. In this example, the computer-readable medium includes instructions that cause the processor to remove the artifact includes using a CNN with a high complexity topology.

Example 25 includes the computer-readable medium of any one of examples 21 to 24, including or excluding optional features. In this example, the computer-readable medium includes instructions that cause the processor to remove the artifact using a CNN-based filter with a stride two convolutional layer and a stride two deconvolutional layer.

Example 26 includes the computer-readable medium of any one of examples 21 to 25, including or excluding optional features. In this example, the computer-readable medium includes instructions that cause the processor to: receive a compressed conventional video bitstream; decompress the conventional video bitstream to generate conventional video frames; and remove an artifact from the conventional video frames.

Example 27 includes the computer-readable medium of any one of examples 21 to 26, including or excluding optional features. In this example, the computer-readable medium includes instructions that cause the processor to train a CNN-based filter to remove blocky artifacts using training pairs of ground truth images and corresponding images with blocky artifacts added.

Example 28 includes the computer-readable medium of any one of examples 21 to 27, including or excluding optional features. In this example, the computer-readable medium includes instructions that cause the processor to train a CNN-based filter to remove ringing artifacts using training pairs of ground truth images and corresponding images with ringing artifacts added.

Example 29 includes the computer-readable medium of any one of examples 21 to 28, including or excluding optional features. In this example, the computer-readable medium includes instructions that cause the processor to train a CNN-based filter to remove blocky radial using training pairs of ground truth images and corresponding images with radial artifacts added.

Example 30 includes the computer-readable medium of any one of examples 21 to 29, including or excluding optional features. In this example, the computer-readable medium includes instructions that cause the processor to train a CNN-based filter to remove blocky artifacts using training pairs of ground truth images and corresponding images with seam artifacts added.

Example 31 is a system for enhancing video. The system includes a decoder to decode a received 360-degree projection format video bitstream to generate a decoded 360-degree projection format video. The system also includes a viewport generator to generate a viewport from the decoded 360-degree projection format video. The system further includes a convolutional neural network (CNN)-based filter to remove an artifact from the viewport to generate an enhanced image. The system also further includes a displayer to send the enhanced image to a display.

Example 32 includes the system of example 31, including or excluding optional features. In this example, the decoder is to receive a compressed conventional video and decompress the conventional video, the CNN-based filter to remove an artifact from the decompressed conventional video.

Example 33 includes the system of any one of examples 31 to 32, including or excluding optional features. In this example, the CNN-based filter includes a CNN with a light complexity (LC) topology.

Example 34 includes the system of any one of examples 31 to 33, including or excluding optional features. In this example, the CNN-based filter includes a CNN with a high complexity (HC) topology.

Example 35 includes the system of any one of examples 31 to 34, including or excluding optional features. In this example, the CNN-based filter includes a CNN with a stride two convolutional layer and a stride two deconvolutional layer.

Example 36 includes the system of any one of examples 31 to 35, including or excluding optional features. In this example, the CNN-based filter includes an out-loop filter.

Example 37 includes the system of any one of examples 31 to 36, including or excluding optional features. In this example, the artifact includes a blocky artifact.

Example 38 includes the system of any one of examples 31 to 37, including or excluding optional features. In this example, the artifact includes a ringing artifact.

Example 39 includes the system of any one of examples 31 to 38, including or excluding optional features. In this example, the artifact includes a radial artifact.

Example 40 includes the system of any one of examples 31 to 39, including or excluding optional features. In this example, the artifact includes a seam artifact.

Example 41 is a system for enhancing video. The system includes means for decoding a received 360-degree projection format video bitstream to generate a decoded 360-degree projection format video. The system also includes means for generating a viewport from the decoded 360-degree projection format video. The system further includes means for removing an artifact from the viewport to generate an enhanced image. The system also further includes means for sending the enhanced image to a display.

Example 42 includes the system of example 41, including or excluding optional features. In this example, the means for decoding the received 360-degree projection format video is to receive a compressed conventional video and decompress the conventional video, the CNN-based filter to remove an artifact from the decompressed conventional video.

Example 43 includes the system of any one of examples 41 to 42, including or excluding optional features. In this example, the means for removing the artifact includes a CNN with a light complexity (LC) topology.

Example 44 includes the system of any one of examples 41 to 43, including or excluding optional features. In this example, the means for removing the artifact includes a CNN with a high complexity (HC) topology.

Example 45 includes the system of any one of examples 41 to 44, including or excluding optional features. In this example, the means for removing the artifact includes a CNN with a stride two convolutional layer and a stride two deconvolutional layer.

Example 46 includes the system of any one of examples 41 to 45, including or excluding optional features. In this example, the means for removing the artifact includes an out-loop filter.

Example 47 includes the system of any one of examples 41 to 46, including or excluding optional features. In this example, the artifact includes a blocky artifact.

Example 48 includes the system of any one of examples 41 to 47, including or excluding optional features. In this example, the artifact includes a ringing artifact.

Example 49 includes the system of any one of examples 41 to 48, including or excluding optional features. In this example, the artifact includes a radial artifact.

Example 50 includes the system of any one of examples 41 to 49, including or excluding optional features. In this example, the artifact includes a seam artifact.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus to enhance video, the apparatus comprising:
   a decoder to decode a 360-degree projection format video bitstream to generate a decoded 360-degree projection format video;
   a viewport generator to generate a viewport from the decoded 360-degree projection format video;
   an out-loop convolutional neural network (CNN)-based filter to remove an artifact from the viewport to generate an enhanced image; and
   display interface circuitry to send the enhanced image to a display.

2. The apparatus of claim 1, wherein the decoder is to decompress conventional video, the out-loop CNN-based filter to remove a second artifact from the decompressed conventional video.

3. The apparatus of claim 1, wherein the out-loop CNN-based filter includes a CNN with a light complexity (LC) topology.

4. The apparatus of claim 1, wherein the out-loop CNN-based filter includes a CNN with a high complexity (HC) topology.

5. The apparatus of claim 1, wherein the out-loop CNN-based filter includes a CNN with a stride two convolutional layer and a stride two deconvolutional layer.

6. The apparatus of claim 1, wherein the artifact includes a blocky artifact.

7. The apparatus of claim 1, wherein the artifact includes a ringing artifact.

8. The apparatus of claim 1, wherein the artifact includes a radial artifact.

9. The apparatus of claim 1, wherein the artifact includes a seam artifact.

10. The apparatus of claim 1, wherein the decoder includes an in-loop filter.

11. A method for enhancing video, the method comprising:
    decoding a 360-degree projection format video bitstream to generate a decoded 360-degree projection format video;
    generating, by at least one processor circuit programmed by at least one instruction, a viewport from the decoded 360-degree projection format video; and
    removing, by one or more of the at least one processor circuit, an artifact from the generated viewport via an out-loop convolutional neural network (CNN)-based filter to generate an enhanced viewport.

12. The method of claim 11, wherein the generating of the viewport includes receiving view information from a display device and generating the viewport from the decoded 360-degree projection format video based on the view information.

13. The method of claim 11, wherein the removing of the artifact includes using a low complexity topology in the out-loop CNN-based filter.

14. The method of claim 11, wherein the removing of the artifact includes using a high complexity topology in the out-loop CNN-based filter.

15. The method of claim 11, wherein the removing of the artifact includes using a stride two convolutional layer and a stride two deconvolutional layer in the out-loop CNN-based filter.

16. The method of claim 11, further including:
    decompressing a conventional video bitstream to generate conventional video frames; and
    removing a second artifact from the conventional video frames via the out-loop CNN-based filter.

17. The method of claim 11, further including training the out-loop CNN-based filter to remove blocky artifacts using training pairs of ground truth images and corresponding images with blocky artifacts added.

18. The method of claim 11, further including training the out-loop CNN-based filter to remove ringing artifacts using training pairs of ground truth images and corresponding images with ringing artifacts added.

19. The method of claim 11, further including training the out-loop CNN-based filter to remove radial artifacts using training pairs of ground truth images and corresponding images with radial artifacts added.

20. The method of claim 11, further including training the out-loop CNN-based filter to remove blocky artifacts using training pairs of ground truth images and corresponding images with seam artifacts added.

21. At least one hard drive, optical drive, thumbdrive, array of drives, solid-state drive, random access memory (RAM), read only memory (ROM), flash memory, or dynamic random access memory (DRAM) comprising machine-readable instructions to cause at least one processor circuit to at least:
    decode a 360-degree projection format video bitstream to generate a decoded 360-degree projection format video;
    generate a viewport from the decoded 360-degree projection format video; and
    remove an artifact from the generated viewport via an out-loop convolutional neural network (CNN)-based filter to generate an enhanced viewport.

22. The at least one hard drive, optical drive, thumbdrive, array of drives, solid-state drive, RAM, ROM, flash memory, or DRAM of claim 21, wherein the machine-readable instructions are to cause one or more of the at least one processor circuit to generate the viewport by receiving view information from a display device and generating the viewport from the decoded 360-degree projection format video based on the view information.

23. The at least one hard drive, optical drive, thumbdrive, array of drives, solid-state drive, RAM, ROM, flash memory, or DRAM of claim 21, wherein the machine-readable instructions are to cause one or more of the at least one processor circuit to remove the artifact using a high complexity topology associated with the out-loop CNN-based filter.

24. The at least one hard drive, optical drive, thumbdrive, array of drives, solid-state drive, RAM, ROM, flash memory, or DRAM of claim 21, wherein the machine-readable instructions are to cause one or more of the at least one processor circuit circuitry to remove the artifact using a stride two convolutional layer and a stride two deconvolutional layer associated with the out-loop CNN-based filter.

25. The at least one hard drive, optical drive, thumbdrive, array of drives, solid-state drive, RAM, ROM, flash memory, or DRAM of claim 21, wherein the machine-readable instructions are to cause one or more of the at least one processor circuit to:
  decompress a conventional video bitstream to generate conventional video frames; and
  remove a second artifact from the conventional video frames via the out-loop CNN-based filter.

\* \* \* \* \*

UNITED STATES PATENT AND TRADEMARK OFFICE
CERTIFICATE OF CORRECTION

PATENT NO. : 12,132,995 B2  
APPLICATION NO. : 17/793348  
DATED : October 29, 2024  
INVENTOR(S) : Dou et al.

Page 1 of 1

It is certified that error appears in the above-identified patent and that said Letters Patent is hereby corrected as shown below:

In the Claims

Column 17, Claim 24, Line 8, Delete "circuitry".

Signed and Sealed this  
Tenth Day of December, 2024

Katherine Kelly Vidal  
*Director of the United States Patent and Trademark Office*